UNITED STATES PATENT OFFICE.

SYLVESTER FRITCH, OF BEATRICE, NEBRASKA, ASSIGNOR OF ONE-HALF TO ISAAC W. FUNCK, OF SAME PLACE.

PROCESS OF PRODUCING FIBER.

SPECIFICATION forming part of Letters Patent No. 432,825, dated July 22, 1890.

Application filed November 9, 1889. Serial No. 329,799. (No specimens.)

*To all whom it may concern:*

Be it known that I, SYLVESTER FRITCH, a citizen of the United States, residing at Beatrice, in the county of Gage and State of Nebraska, have invented certain new and useful Improvements in Processes of Producing Fiber; and I do declare the following to be a full, clear, and exact description of the invention, such as will enable others skilled in the art to which it appertains to practice the same.

My invention relates to processes for reducing cornstalks, leaves, husks, broom-corn, sorghum, sugar-cane, flax and hemp, and other fiber-producing plants of like nature, so as to produce a fiber suitable for use in the manufacture of textile fabrics, twine, rope, or paper.

The object of the invention is to generally improve upon and lessen the expense of processes of this kind, and to provide a means whereby a much finer grade of fiber may be produced.

To the above ends the invention consists in the process hereinafter described and afterward specifically defined in the appended claim.

In carrying out my process I first pass the cornstalks (or other plants to be operated upon) between heavy rollers, in order to crush the plants and destroy the joints or knots. The plants are then placed within a tank, into which a sufficient amount of water has been introduced to cover the plants. The water should be at a temperature of 200° Fahrenheit. A solution of sulphuric or other equivalent acid is added to the compound, the proportion of acid being one pound to each fifty gallons of water. The plants are allowed to remain in this solution for about twenty-four hours, after which they are taken out and passed between rollers, which press the stalks and remove the heart or pith. The plants are next placed within a suitable open crate, which is provided at its bottom with a swinging door, through which the contents of the crate may be emptied. The crate, with its contents, is then placed within a boiler containing the following ingredients: To each seventy-five gallons of water are added three pounds of unslaked lime, one pound of oxide of magnesium, and one pound of the carbonate of potash, one-fourth of a pound of olive-oil or other fixed oil, the oil being added to the compound for the purpose of strengthening and softening the fiber. The plants are boiled for one hour in this solution, after which they are removed from the tank and the mass is thoroughly washed in water containing a solution of soap and ammonia, in order to thoroughly cleanse and soften the fiber. The fiber is then placed upon an endless apron and is carried by the said apron beneath heavy presser-rolls, in order to effectually remove all gummy and starchy substances which may exist, after which the fiber is thoroughly dried and is in readiness for use.

Having thus described my invention, what I claim as new, and desire to secure by Letters Patent, is—

The herein-described process of treating plants in order to produce a fiber suitable for use in the manufacture of textile fabrics, twine, rope, paper, &c., the same consisting in first crushing the plants, then allowing them to remain for twenty-four hours in a preparation of water and sulphuric or its equivalent acid in substantially the proportions specified, afterward pressing and removing the pith from the stalks, then boiling the plants for one hour in a compound consisting of water holding an alkali and oil in solution, then subjecting them to rolling pressure, and afterward drying, substantially as described, and for the purpose specified.

In testimony whereof I affix my signature in presence of two witnesses.

SYLVESTER FRITCH.

Witnesses:
  A. J. GLICK.
  I. W. FUNCK.